US012523997B2

United States Patent
Handa

(10) Patent No.: US 12,523,997 B2
(45) Date of Patent: Jan. 13, 2026

(54) VOLUME ESTIMATING DEVICE, HYDROGEN FILLING DEVICE, AND VOLUME ESTIMATING METHOD

(71) Applicant: HONDA MOTOR CO., LTD., Tokyo (JP)

(72) Inventor: Kiyoshi Handa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 392 days.

(21) Appl. No.: 18/239,272

(22) Filed: Aug. 29, 2023

(65) Prior Publication Data

US 2024/0085895 A1 Mar. 14, 2024

(30) Foreign Application Priority Data

Sep. 1, 2022 (JP) ................................. 2022-139225

(51) Int. Cl.
*G01F 17/00* (2006.01)
*G05B 19/43* (2006.01)

(52) U.S. Cl.
CPC ............ *G05B 19/43* (2013.01); *G01F 17/00* (2013.01)

(58) Field of Classification Search
CPC ......... G05B 19/43; G01F 17/00; G01F 22/02; G01F 23/14; G01F 23/18; F17C 5/007; F17C 5/06; Y02E 60/32
See application file for complete search history.

(56) References Cited

U.S. PATENT DOCUMENTS

2010/0307636 A1* 12/2010 Uemura .................... F17C 5/06
141/4
2016/0305611 A1* 10/2016 Handa ....................... F17C 5/06
2019/0086032 A1* 3/2019 Handa ....................... F17C 5/06
2019/0301678 A1* 10/2019 Yamaguchi ........... F17C 13/025
2022/0373134 A1* 11/2022 Sinding ..................... F17C 5/06

FOREIGN PATENT DOCUMENTS

JP 2019-002515 A 1/2019
JP 2019-178758 A 10/2019

OTHER PUBLICATIONS

Office Action dated Sep. 24, 2025 issued in the corresponding Japanese Patent Application No. 2022-139225 with the English machine translation thereof.
Kiyoshi Handa et al., "Precooling temperature relaxation technology in hydrogen refueling for fuel-cell vehicles",—ScienceDirect, International Journal of Hydrogen Energy, vol. 46, Issue 67, Sep. 28, 2021, pp. 33511-33522.
Kiyoshi Handa et al., "Development of A New Hydrogen Refueling Method for FCV," Transactions of Society of Automotive Engineers of Japan, vol. 47, Issue 2, pp. 407-412, Nov. 10, 2016.

* cited by examiner

*Primary Examiner* — Kamini S Shah
*Assistant Examiner* — Mohammed Shafayet
(74) *Attorney, Agent, or Firm* — Carrier, Shende & Associate P.C.; Joseph P. Carrier; Fulchand P. Shende

(57) ABSTRACT

A volume estimating device includes: a gas density acquiring section that acquires a first gas density and a second gas density; an expansion rate acquiring section that acquires a first corrected expansion rate and a second corrected expansion rate; a filling amount acquiring section that acquires a total filling amount; and a volume estimating section that estimates a volume of a hydrogen tank based on a volume of a supplying portion, the first gas density, the second gas density, the first corrected expansion rate, the second corrected expansion rate, and the total filling amount.

4 Claims, 4 Drawing Sheets

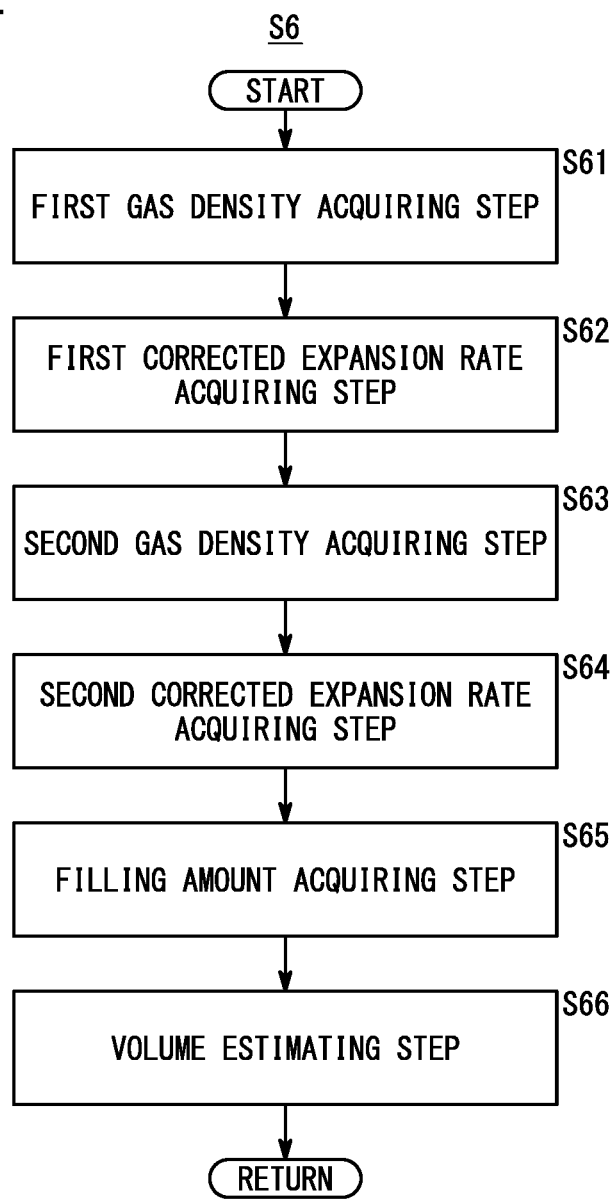

VOLUME ESTIMATING DEVICE, HYDROGEN FILLING DEVICE, AND VOLUME ESTIMATING METHOD

CROSS-REFERENCE TO RELATED APPLICATIONS

This application is based upon and claims the benefit of priority from Japanese Patent Application No. 2022-139225 filed on Sep. 1, 2022, the contents of which are incorporated herein by reference.

BACKGROUND OF THE INVENTION

Field of the Invention

The present invention relates to a volume estimating device, a hydrogen filling device, and a volume estimating method.

Description of the Related Art

In recent years, to ensure access to affordable, reliable, sustainable, and advanced energy for more people, research and development have been made into fuel cells that realize greater energy efficiency. For example, research and development are being made into hydrogen filling devices. A hydrogen filling device is a device for filling a hydrogen tank of an FCV (Fuel Cell Vehicle) with hydrogen gas.

The hydrogen filling device fills the hydrogen tank with hydrogen gas based on a filling control map. The filling control map is a control map indicating the filling speed for the hydrogen gas into the hydrogen tank. The hydrogen filling device stores a plurality of filling control maps having differing filling speeds.

The hydrogen filling device determines the filling control map to be used by using vehicle information transmitted from the FCV. The vehicle information includes volume information. The volume information indicates the volume of the hydrogen tank (see JP 2019-002515 A as well).

SUMMARY OF THE INVENTION

Due to various reasons such as incorrect remodeling, there can be cases where the volume information is inaccurate. If the volume information is inaccurate, the hydrogen filling device cannot correctly determine the filling control map. In such a situation, there is a desire to be able to estimate the correct volume for the hydrogen tank even when the volume information is inaccurate.

The present invention has the object of achieving this aim.

A first aspect of the present invention is a volume estimating device that, when a hydrogen tank of a vehicle is to be filled with hydrogen gas from a supplying portion of a hydrogen filling device, estimates a volume of the hydrogen tank, the volume estimating device comprising: a gas density acquiring section that acquires a first gas density inside the hydrogen tank based on gas pressure inside the hydrogen tank and a tank temperature at a first timing, and acquires a second gas density inside the hydrogen tank based on the gas pressure and the tank temperature at a second timing that is after the first timing; an expansion rate acquiring section that acquires a first corrected expansion rate obtained by correcting an expansion rate of the hydrogen tank in a prescribed state based on the gas pressure at the first timing, and acquires a second corrected expansion rate obtained by correcting the expansion rate based on the gas pressure at the second timing; a filling amount acquiring section that acquires a total filling amount of the hydrogen gas that has filled the hydrogen tank from the hydrogen filling device in a period from the first timing to the second timing; and a volume estimating section that estimates a volume of the hydrogen tank based on a volume of the supplying portion, the first gas density, the second gas density, the first corrected expansion rate, the second corrected expansion rate, and the total filling amount.

A second aspect of the present invention is a hydrogen filling device that fills a hydrogen tank of a vehicle with hydrogen gas based on a filling control map indicating a filling speed of the hydrogen gas corresponding to an initial pressure inside the hydrogen tank, the hydrogen filling device comprising: the volume estimating device according to the first aspect described above; a provisional volume acquiring section that acquires a provisional volume of the hydrogen tank based on the initial pressure; a volume judging section that judges whether a difference between the provisional volume and the volume of the hydrogen tank estimated by the volume estimating device is within a tolerable range; and a filling control section that, if the volume judging section has judged that the difference is outside the tolerable range, fills the hydrogen tank with the hydrogen gas at a filling speed that is lower than the filling speed corresponding to the initial pressure.

A third aspect of the present invention is a volume estimating method for, when a hydrogen tank of a vehicle is to be filled with hydrogen gas from a supplying portion of a hydrogen filling device, estimating a volume of the hydrogen tank, the volume estimating method comprising: a first gas density acquiring step of acquiring a first gas density inside the hydrogen tank based on gas pressure inside the hydrogen tank and a tank temperature at a first timing; a first corrected expansion rate acquiring step of acquiring a first corrected expansion rate obtained by correcting an expansion rate of the hydrogen tank in a prescribed state based on the gas pressure at the first timing; a second gas density acquiring step of acquiring a second gas density inside the hydrogen tank based on the gas pressure and the tank temperature at a second timing that is after the first timing; a second corrected expansion rate acquiring step of acquiring a second corrected expansion rate obtained by correcting the expansion rate based on the gas pressure at the second timing; a filling amount acquiring step of acquiring a total filling amount of the hydrogen gas that has filled the hydrogen tank from the hydrogen filling device in a period from the first timing to the second timing; and a volume estimating step of estimating a volume of the hydrogen tank based on a volume of the supplying portion, the first gas density, the second gas density, the first corrected expansion rate, the second corrected expansion rate, and the total filling amount.

According to the present invention, it is possible to accurately estimate the volume of the hydrogen tank.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 4 is a flow chart showing an example of a volume estimating process step S6 of FIG. 3.

DETAILED DESCRIPTION OF THE INVENTION

Embodiment

Figure 1:
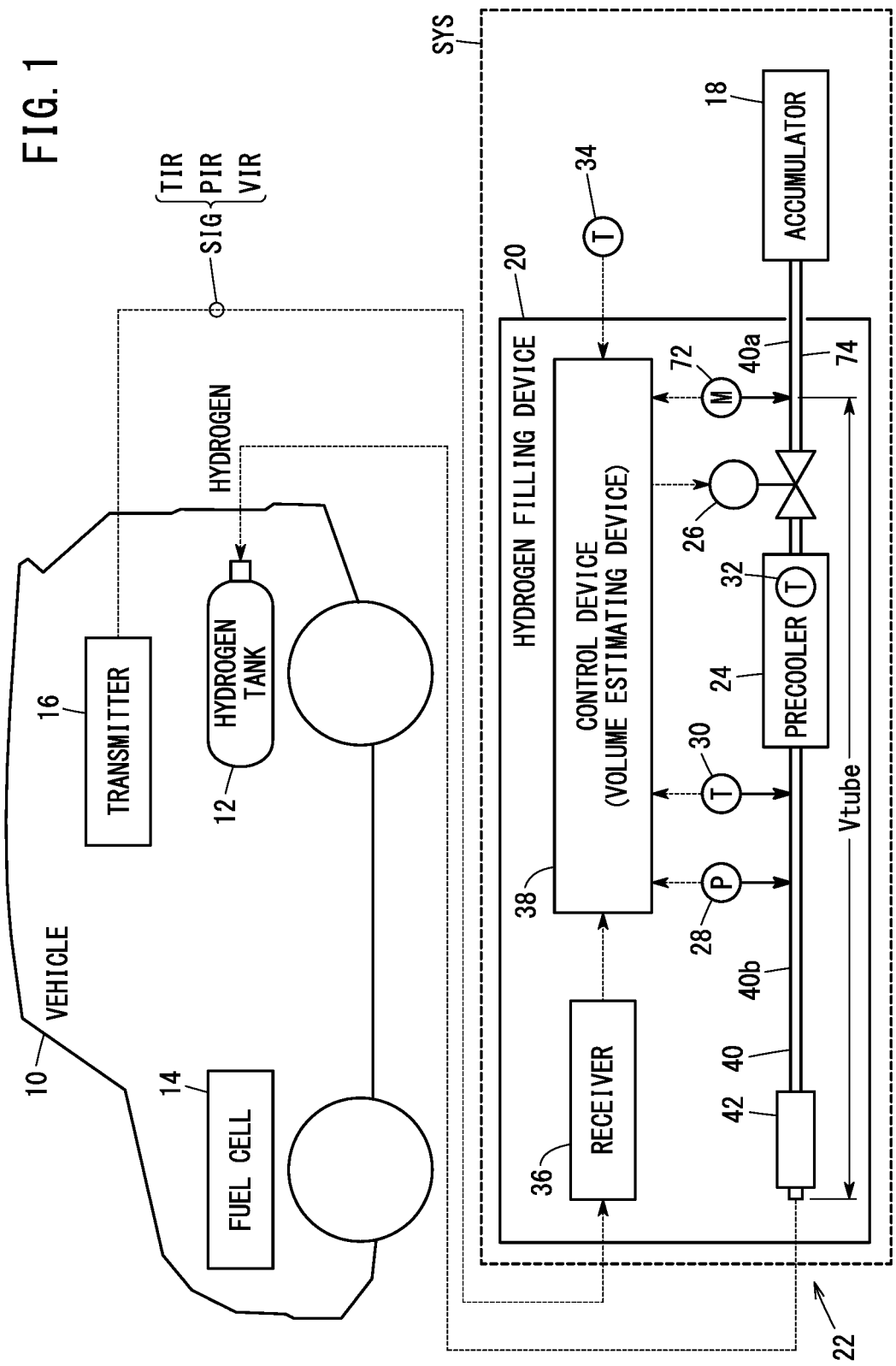
FIG. 1 is a schematic diagram showing a hydrogen filling system and a vehicle according to an embodiment.

FIG. 1 is a schematic diagram showing a hydrogen filling system SYS and a vehicle 10 according to an embodiment.

The vehicle 10 is an FCV, for example. The vehicle 10 includes a hydrogen tank 12, a fuel cell 14, and a transmitter 16. The hydrogen tank 12 stores hydrogen gas. The fuel cell 14 generates power using the hydrogen gas stored in the hydrogen tank 12. The vehicle 10 travels using the power generated by the fuel cell 14.

The transmitter 16 is a communicator that transmits vehicle information SIG to a receiver 36 described further below. The vehicle information SIG includes temperature information TIR, pressure information PIR, and volume information VIR.

The temperature information TIR is information (a signal) indicating a tank temperature, which is the temperature of the hydrogen tank 12. The pressure information PIR is information (a signal) indicating gas pressure inside the hydrogen tank 12. The volume information VIR is information (a signal) indicating a volume of the hydrogen tank 12. For the sake of convenience, the volume of the hydrogen tank 12 indicated by the volume information VIR is also referred to as a first provisional volume V1.

The transmitter 16 sequentially transmits the vehicle information SIG to the receiver 36, until the hydrogen filling of the hydrogen tank 12 is complete. As an example, after having transmitted the temperature information TIR (vehicle information SIG) indicating the tank temperature at a first timing, the transmitter 16 transmits the temperature information TIR (vehicle information SIG) indicating the tank temperature at a second timing that is after the first timing. The transmitter 16 may transmit the vehicle information SIG three or more times.

The hydrogen filling system SYS is a system for filling the hydrogen tank 12 with hydrogen gas. The hydrogen filling system SYS is provided to a hydrogen station, for example. The hydrogen filling system SYS includes an accumulator 18 and a hydrogen filling device 20.

The accumulator 18 is a device that stores pressurized hydrogen gas.

The hydrogen filling device 20 is a device that supplies the hydrogen tank 12 with hydrogen gas pressurized in the accumulator 18. The hydrogen filling device 20 includes a supplying portion 22, a precooler 24, an adjustment valve 26, a pressure sensor 28, a supplying portion temperature sensor 30, a precooler temperature sensor 32, an ambient temperature sensor 34, the receiver 36, and a control device (volume estimating device) 38.

The supplying portion 22 includes a supply pipe 40 and a nozzle 42. The supply pipe 40 connects the accumulator 18 and the nozzle 42. The nozzle 42 can be connected to the hydrogen tank 12. By connecting the nozzle 42 and the hydrogen tank 12 to each other, it is possible to supply the hydrogen gas from the accumulator 18 to the hydrogen tank 12.

The precooler 24 is a heat exchanger that cools the hydrogen gas before filling the hydrogen tank 12. The precooler 24 is connected to the supply pipe 40.

The adjustment valve 26 is a valve that adjusts the flow rate of the hydrogen gas supplied from the accumulator 18 to the hydrogen tank 12. The adjustment valve 26 is provided between the accumulator 18 and the precooler 24, in the supply pipe 40. The adjustment valve 26 is controlled by a filling control section 60, described further below.

The pressure sensor 28 is provided to the supplying portion 22. More specifically, the pressure sensor 28 is provided to the supply pipe 40. The pressure sensor 28 outputs a detection signal corresponding to the gas pressure inside the supplying portion 22. This detection signal is input to the control device 38.

By performing preshot filling of the hydrogen tank 12 with the hydrogen gas, the gas pressure inside the supplying portion 22 and the gas pressure inside the hydrogen tank 12 become approximately the same. Accordingly, after the preshot filling, it is possible to detect the gas pressure inside the hydrogen tank 12 based on the detection signal of the pressure sensor 28. The preshot filling is performed by the filling control section 60 described further below, for example. Since preshot filling is a well-known technique, a detailed explanation of the preshot filling is not provided.

The supplying portion temperature sensor 30 is provided to the supplying portion 22. The supplying portion temperature sensor 30 outputs a detection signal corresponding to the temperature of the supplying portion 22. This detection signal is input to the control device 38.

The precooler temperature sensor 32 is provided to the precooler 24. The precooler temperature sensor 32 outputs a detection signal corresponding to the temperature of the precooler 24. This detection signal is input to the control device 38.

The ambient temperature sensor 34 outputs a detection signal corresponding to the ambient temperature (temperature inside the hydrogen station). This detection signal is input to the control device 38. The ambient temperature sensor 34 is provided to the hydrogen filling device 20, for example. However, the ambient temperature sensor 34 may instead be installed at a location other than the hydrogen filling device 20.

The receiver 36 is a communicator that communicates with the transmitter 16 and receives the vehicle information SIG. The communication system used for the transmitter 16 and the receiver 36 is infrared communication, for example. However, the transmitter 16 and receiver 36 may communicate using a system other than infrared communication.

Figure 2:
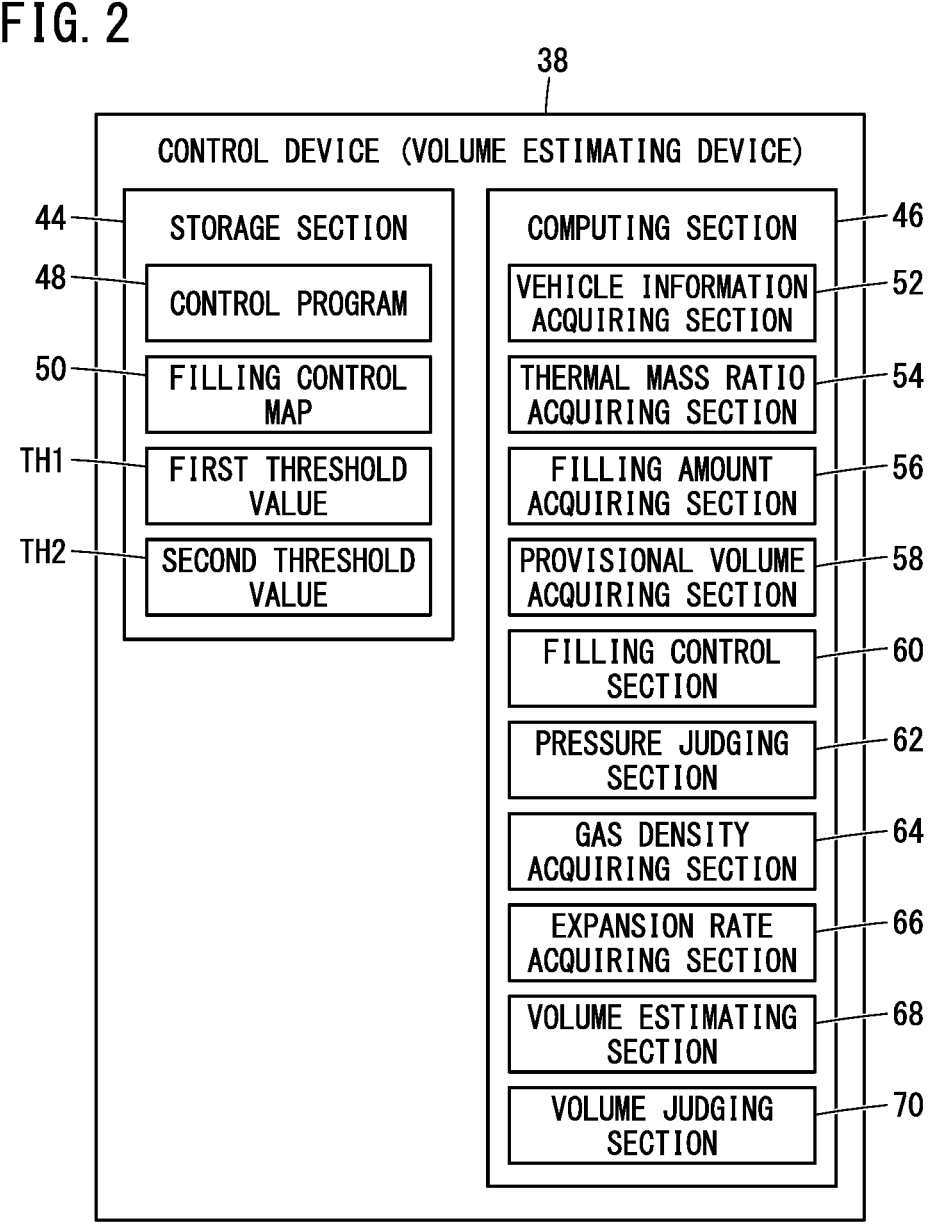
FIG. 2 is a block diagram of a control device (volume estimating device)

FIG. 2 is a block diagram of the control device (volume estimating device) 38.

The control device 38 is a computer provided to the hydrogen filling device 20. The control device 38 includes a storage section 44 and a computing section 46.

The storage section 44 can be formed by a volatile memory (not shown) and a nonvolatile memory (not shown). The volatile memory can be a RAM (Random Access Memory) or the like, for example. The nonvolatile memory can be a ROM (Read Only Memory), a flash memory, or the like, for example. Data and the like can be stored in the volatile memory, for example. Programs, data tables, maps, and the like can be stored in the nonvolatile memory, for example. At least part of the storage section 44 may be included in a processor, an integrated circuit, or the like described further below.

The storage section 44 stores a control program 48, a filling control map 50, a first threshold value TH1, and a second threshold value TH2.

The control program 48 is a program including content that causes the hydrogen filling device 20 to perform a volume estimating method according to the present embodiment.

The filling control map 50 shows a correspondence relationship among an initial pressure PI inside the hydrogen tank 12, a volume of the hydrogen tank 12, a thermal mass ratio TMR of the heat volume of the supplying portion 22, and a filling speed (pressure increase rate) of the hydrogen gas. The filling control map 50 shows a plurality of filling speeds corresponding to combinations of the initial pressure PI, the volume, and the thermal mass ratio TMR. The initial pressure PI is the gas pressure inside the hydrogen tank 12 before the main filling is started. The main filling and the thermal mass ratio TMR will be described further below.

The first threshold value TH1 is a prescribed value of the gas pressure inside the hydrogen tank 12. The first threshold value TH1 is determined in advance based on experimentation, for example, and also in consideration of a pressure judging section 62 described further below. The second threshold value TH2 is a tolerable error between the first provisional volume V1 and an estimated volume V3 described further below.

The computing section 46 can be formed by a processor such as a CPU (Central Processing Unit) or a GPU (Graphics Processing Unit), for example. That is, the computing section 46 can be formed by processing circuitry.

The computing section 46 includes a vehicle information acquiring section 52, a thermal mass ratio acquiring section 54, a filling amount acquiring section 56, a provisional volume acquiring section 58, the filling control section 60, the pressure judging section 62, a gas density acquiring section 64, an expansion rate acquiring section 66, a volume estimating section 68, and a volume judging section 70.

The vehicle information acquiring section 52, the thermal mass ratio acquiring section 54, the filling amount acquiring section 56, the provisional volume acquiring section 58, the filling control section 60, the pressure judging section 62, the gas density acquiring section 64, the expansion rate acquiring section 66, the volume estimating section 68, and the volume judging section 70 are realized by having the computing section 46 execute the control program 48. At least some of the vehicle information acquiring section 52, the thermal mass ratio acquiring section 54, the filling amount acquiring section 56, the provisional volume acquiring section 58, the filling control section 60, the pressure judging section 62, the gas density acquiring section 64, the expansion rate acquiring section 66, the volume estimating section 68, and the volume judging section 70 may be realized by an integrated circuit such as an ASIC (Application Specific Integrated Circuit) or an FPGA (Field-Programmable Gate Array). At least some of the vehicle information acquiring section 52, the thermal mass ratio acquiring section 54, the filling amount acquiring section 56, the provisional volume acquiring section 58, the filling control section 60, the pressure judging section 62, the gas density acquiring section 64, the expansion rate acquiring section 66, the volume estimating section 68, and the volume judging section 70 may be formed by an electronic circuit that includes a discrete device.

The vehicle information acquiring section 52 acquires the vehicle information SIG via the receiver 36. That is, the vehicle information acquiring section 52 acquires the temperature information TIR, the pressure information PIR, and the volume information VIR.

The thermal mass ratio acquiring section 54 acquires the thermal mass ratio TMR of the heat volume of the supplying portion 22. The thermal mass ratio acquiring section 54 calculates the thermal mass ratio TMR based on Expression (1), for example (also see "International Journal of Hydrogen Energy, Volume 46, Issue 67, 28 September 2021, Pages 33511-33522, Precooling temperature relaxation technology in hydrogen refueling for fuel-cell vehicles—ScienceDirect" 2021, by Kiyoshi Handa, Shinji Oshima, Tatsuya Rembutsu, et al). In Expression (1), $T_{tube}$ is the average temperature of the supplying portion 22. The thermal mass ratio acquiring section 54 acquires the average temperature ($T_{tube}$) of the supplying portion 22 based on the detection signal of the supplying portion temperature sensor 30, for example. Further, $T_{precooling}$ is the temperature of the hydrogen gas cooled by the precooler 24. The thermal mass ratio acquiring section 54 acquires the temperature ($T_{precooling}$) of the cooled hydrogen gas based on the detection signal of the precooler temperature sensor 32, for example. $T_{amb}$ is the ambient temperature. The thermal mass ratio acquiring section 54 acquires the ambient temperature ($T_{amb}$) based on the ambient temperature sensor 34, for example. $mC_{station}$ is the heat volume of the supplying portion 22 described above. $mC_{model}$ is a reference value for the heat volume. The heat volume of the supplying portion 22 and the reference value for the heat volume are determined in advance as constants, based on experimentation in which a model case of hydrogen filling is envisioned, for example.

$$TMR = \frac{T_{tube} - T_{precooling}}{T_{amb} - T_{precooling}} \times \frac{mC_{station}}{mC_{model}} \qquad \text{Expression (1)}$$

The filling amount acquiring section 56 acquires a hydrogen filling amount, which is the amount of hydrogen gas filling the hydrogen tank 12 due to the hydrogen filling device 20. The filling amount acquiring section 56 acquires the hydrogen filling amount using the detection signal of a flow rate sensor 72.

The flow rate sensor 72 is a mass flowmeter, for example. The flow rate sensor 72 outputs a detection signal corresponding to the flow rate of the hydrogen gas supplied from the accumulator 18 to the hydrogen tank 12. The flow rate sensor 72 is provided between the accumulator 18 and the precooler 24, in the supply pipe 40 (see FIG. 1).

If the gas pressure inside the hydrogen tank 12 and the gas pressure inside the hydrogen filling device 20 (supplying portion 22) are not the same, it is difficult to accurately calculate the hydrogen filling amount even if the flow rate sensor 72 (mass flowmeter) is used. Accordingly, the filling amount acquiring section 56 preferably acquires the hydrogen filling amount based on the detection signal output by the flow rate sensor 72 when the hydrogen filling is performed after preshot filling.

The provisional volume acquiring section 58 acquires information indicating a second provisional volume V2 of the hydrogen tank 12. The second provisional volume V2 is an estimated value of the volume of the hydrogen tank 12. The second provisional volume V2 is calculated based on a change amount of the gas pressure inside the supplying portion 22 due to the preshot filling. The provisional volume acquiring section 58 can acquire the change amount of the gas pressure inside the supplying portion 22 caused by the preshot filling, based on the detection signal from the pressure sensor 28.

The filling control section 60 uses the filling control map 50 to determine the filling speed of the hydrogen gas filling the hydrogen tank 12. Here, in order to determine the filling speed of the hydrogen gas, the filling control section 60 judges whether a difference between the first provisional volume V1 and the second provisional volume V2 is greater than or equal to a prescribed value.

When the difference between the first provisional volume V1 and the second provisional volume V2 is greater than or equal to the prescribed value, the filling control section 60 selects the lowest filling speed among the filling control maps 50. The reason that the filling control section 60 selects the lowest filling speed among the filling control maps 50 when the difference between the first provisional volume V1 and the second provisional volume V2 is greater than or equal to the prescribed value is as follows.

When the difference between the first provisional volume V1 and the second provisional volume V2 is greater than or equal to the prescribed value, there is a possibility that there is an error in the volume information VIR. If there is an error in the volume information VIR, then it is possible that there is an error in both the temperature information TIR and the pressure information PIR. Selecting a high filling speed while there are errors in the volume information VIR, the temperature information TIR, and the pressure information PIR increases the risk of the hydrogen tank 12 overheating during the hydrogen filling. Therefore, when the difference between the first provisional volume V1 and the second provisional volume V2 is greater than or equal to the prescribed value, the filling control section 60 preferably selects a filling speed that is as low as possible. As a result, it is possible to minimize the risk of the hydrogen tank 12 overheating during the hydrogen filling.

When the difference between the first provisional volume V1 and the second provisional volume V2 is less than the prescribed value, the filling control section 60 determines the filling speed based on the filling control map 50, the initial pressure PI, the volume of the hydrogen tank 12, and the thermal mass ratio TMR. The filling control section 60 can acquire the initial pressure PI based on the detection signal output by the pressure sensor 28 after the preshot filling. Instead, the filling control section 60 may acquire the initial pressure PI based on the pressure information PIR. The filling control section 60 uses the first provisional volume V1 or the second provisional volume V2 as the volume of the hydrogen tank 12. The filling control section 60 uses the thermal mass ratio TMR acquired by the thermal mass ratio acquiring section 54.

The filling control section 60 fills the hydrogen tank 12 with the hydrogen gas by controlling the adjustment valve 26 based on the determined filling speed. In the following description, the hydrogen filling performed based on the filling speed determined by the filling control section 60 is referred to as the main filling, to differentiate this hydrogen filling from the preshot filling. The filling control section 60 performs the main filling based on the MC Formula, for example (see also "Development of a New Hydrogen Refueling Method for FCV," Transactions of Society of Automotive Engineers of Japan, Vol. 47, No. 2, p. 407-412 (2016), by Kiyoshi Handa, Steve Mathison, et al).

The pressure judging section 62 judges whether the gas pressure inside the hydrogen tank 12 exceeds the first threshold value TH1. More specifically, the pressure judging section 62 judges whether the gas pressure inside the hydrogen tank 12 at timings after the start of the main filling exceeds the first threshold value TH1. The pressure judging section 62 acquires the gas pressure inside the hydrogen tank 12 based on the detection signal of the pressure sensor 28. The gas pressure compared to the first threshold value TH1 by the pressure judging section 62 is also referred to as a gas pressure Pi in the following description.

If it is judged by the pressure judging section 62 that the gas pressure Pi is less than or equal to the first threshold value TH1, the filling control section 60 continues performing the main filling without change. On the other hand, if it is judged by the pressure judging section 62 that the gas pressure Pi exceeds the first threshold value TH1, the filling control section 60, the gas density acquiring section 64, the expansion rate acquiring section 66, the volume estimating section 68, and the volume judging section 70 perform the process described below.

The gas density acquiring section 64 acquires the gas density inside the hydrogen tank 12, based on the gas pressure inside the hydrogen tank 12 and the tank temperature. Here, the gas density acquiring section 64 acquires the gas pressure inside the hydrogen tank 12 based on the detection signal of the pressure sensor 28. Furthermore, the gas density acquiring section 64 acquires the tank temperature based on the temperature information TIR. The gas density acquiring section 64 calculates an approximate value of the gas density inside the hydrogen tank 12, using the gas state equation, the gas pressure inside the hydrogen tank 12, and the tank temperature, for example. The gas density acquiring section 64 acquires this approximate value as the gas density inside the hydrogen tank 12.

The gas density acquiring section 64 acquires the gas density inside the hydrogen tank 12 at least at each of a first timing and a second timing. The first timing and the second timing are each a timing contained within the period during which the main filling is performed. The second timing is later than the first timing. The first timing may be the timing at which the main filling starts.

In the following description, the gas density inside the hydrogen tank 12 at the first timing is also referred to as a first gas density $\rho_1$. The gas density acquiring section 64 acquires the first gas density $\rho_1$ based on the gas state equation, the gas pressure inside the hydrogen tank 12 at the first timing, and the tank temperature at the first timing.

In contrast to the first gas density $\rho_1$, the gas density inside the hydrogen tank 12 at the second timing is referred to as a second gas density $\rho_2$ in the following description. The gas density acquiring section 64 acquires the second gas density $\rho_2$ based on the gas state equation, the gas pressure inside the hydrogen tank 12 at the second timing, and the tank temperature at the second timing.

The expansion rate acquiring section 66 corrects a prescribed expansion rate, using the gas pressure inside the hydrogen tank 12 at the first timing. The prescribed expansion rate is the expansion rate of the hydrogen tank 12 in a prescribed state. In the following description, the expansion rate that has been corrected using the gas pressure inside the hydrogen tank 12 at the first timing is also referred to as a first corrected expansion rate $\theta_1$.

The expansion rate acquiring section 66 calculates the first corrected expansion rate $\theta_1$ using Expression (2), for example. In Expression (2), $\theta_1$ is the first corrected expansion rate $\theta_1$. PR is the rated pressure (constant) of the hydrogen tank 12. $P_1$ is the gas pressure at the first timing. $\theta_0$ is a prescribed expansion rate (constant).

$$\theta_1 = 1.0 - \left(1.0 - \frac{P_1}{PR}\right)\theta_0 \qquad \text{Expression (2)}$$

Furthermore, the expansion rate acquiring section 66 corrects the prescribed expansion rate using the gas pressure inside the hydrogen tank 12 at the second timing. In the following description, the expansion rate that has been corrected using the gas pressure inside the hydrogen tank 12 at the second timing is also referred to as a second corrected expansion rate $\theta_2$. The expansion rate acquiring section 66 can calculate the second corrected expansion rate $\theta_2$ using the same calculation method as used for the first corrected expansion rate $\theta_1$. That is, by substituting $\theta_1$ of Expression (2) with the second corrected expansion rate $\theta_2$ and substituting $P_1$ of Expression (2) with the gas pressure at the second timing, the expansion rate acquiring section 66 can calculate the second corrected expansion rate $\theta_2$.

The volume estimating section 68 estimates the volume of the hydrogen tank 12 based on the first gas density $\rho_1$, the second gas density $\rho_2$, the first corrected expansion rate $\theta_1$, the second corrected expansion rate $\theta_2$, a total filling amount dm, and a volume $V_{tube}$ of the supplying portion 22. The total filling amount dm is the amount of hydrogen filled in the period from the first timing to the second timing. The total filling amount dm is acquired by the filling amount acquiring section 56, based on the detection signal of the flow rate sensor 72. The volume $V_{tube}$ of the supplying portion 22 is the volume of the portion of the supplying portion 22 from the flow rate sensor 72 to the hydrogen tank 12.

In the following description, the volume of the hydrogen tank 12 estimated by the volume estimating section 68 is also referred to as the estimated volume V3. The volume estimating section 68 can estimate the estimated volume V3 using Expression (3). In Expression (3), $\rho_1$ is the first gas density $\rho_1$. $\rho_2$ is the second gas density $\rho_2$. $\theta_1$ is the first corrected expansion rate $\theta_1$. $\theta_2$ is the second corrected expansion rate $\theta_2$. dm is the total filling amount dm. $V_{tube}$ is the volume $V_{tube}$ of the supplying portion 22.

$$V3 = \frac{dm - (\rho_2 - \rho_1)V_{tube}}{\rho_2\theta_2 - \rho_1\theta_1} \qquad \text{Expression (3)}$$

Using Expression (3), the volume estimating section 68 can accurately estimate the volume of the hydrogen tank 12. The reason for this is as follows.

In Expression (3), the denominator on the right side represents the change of the gas density of the hydrogen gas corresponding to the passage of time from the first timing to the second timing. This change of the gas density takes into consideration the change of the expansion rate corresponding to the passage of time from the first timing to the second timing. Accordingly, the denominator on the right side in Expression (3) accurately represents the change of the gas density inside the hydrogen tank 12.

In Expression (3), the numerator on the right side represents the hydrogen gas amount filling the hydrogen tank 12 in the period from the first timing to the second timing. This hydrogen gas amount is a value obtained by subtracting the hydrogen gas amount inside the supplying portion 22 from the total filling amount dm. The reason that the value obtained by subtracting the hydrogen gas amount inside the supplying portion 22 from the total filling amount dm is the hydrogen gas amount filling the hydrogen tank 12 is as follows.

The total filling amount dm is the amount of hydrogen filled in the period from the first timing to the second timing. More precisely, the total filling amount dm is the hydrogen gas amount that has been sent to the hydrogen tank 12 through the supplying portion 22. However, a portion of the hydrogen gas flowing inside the supplying portion 22 remains inside the supplying portion 22. Accordingly, in order to obtain the hydrogen gas amount that has filled the hydrogen tank 12 in the period from the first timing to the second timing with the highest accuracy possible, it is necessary to subtract the hydrogen gas amount inside the supplying portion 22 from the total filling amount dm.

Furthermore, according to the present embodiment, the volume $V_{tube}$ of the supplying portion 22 is the volume of the portion of the supplying portion 22 from the flow rate sensor 72 to the hydrogen tank 12. The reason that the volume of the portion of the supplying portion 22 from the flow rate sensor 72 to the hydrogen tank 12 is used as the volume $V_{tube}$ of the supplying portion 22 is as follows. For the sake of convenience, the portion of the supplying portion 22 that is further to the accumulator 18 side than the flow rate sensor 72 is referred to as an upstream portion 40a in the following description. Furthermore, the portion of the supplying portion 22 other than the upstream portion 40a is also referred to as a downstream portion 40b.

The flow rate sensor 72 outputs a detection signal corresponding to the flow rate of the hydrogen gas supplied from the accumulator 18 to the hydrogen tank 12. More precisely, the flow rate sensor 72 outputs a detection signal corresponding to the flow rate of the hydrogen gas that has passed through the location in the supplying portion 22 where the flow rate sensor 72 is installed. In other words, the hydrogen gas amount inside the upstream portion 40a is not reflected in the detection signal of the flow rate sensor 72. Accordingly, in order to express the hydrogen gas amount inside the supplying portion 22 as accurately as possible in Expression (3), it is necessary to use the volume of only the downstream portion 40b.

In this way, the volume estimating section 68 acquires the estimated volume V3 that takes into account the hydrogen gas amount inside the supplying portion 22 and the change of the expansion rate of the hydrogen tank 12. The estimated volume V3 becomes a value that is closer than the second provisional volume V2 to the actual volume of the hydrogen tank 12, by an amount corresponding to the change of the expansion rate of the hydrogen tank 12 and the hydrogen gas amount inside the supplying portion 22.

The volume judging section 70 judges whether the difference (error) between the estimated volume V3 and the first provisional volume V1 is within a tolerable range, using the second threshold value TH2. For example, the volume judging section 70 judges whether |V3−V1|/V1<TH2 is satisfied. In this way, the volume judging section 70 judges whether the error between the estimated volume V3 and the first provisional volume V1 is within the tolerable range. Here, the volume judging section 70 may use the second provisional volume V2 as the first provisional volume V1.

If the volume judging section 70 judges that the error between the estimated volume V3 and the first provisional volume V1 is outside the tolerable range, the filling control section 60 fills the hydrogen tank 12 with the hydrogen gas at a filling speed that is lower than the filling speed corresponding to the initial pressure PI. For example, if the volume judging section 70 judges that the error between the estimated volume V3 and the first provisional volume V1 is outside the tolerable range, the filling control section 60 switches to the lowest filling speed among the filling control maps 50, and continues the main filling. Due to this, the risk of the hydrogen tank 12 overheating during the main filling is reduced. The reason for this is as follows.

As described above, when the main filling is started, the filling control section 60 determines the filling speed using the first provisional volume V1 or the second provisional volume V2. Assuming a case where the error between the estimated volume V3 and the first provisional volume V1 is outside the tolerable range, there is a high possibility that the second provisional volume V2 and the first provisional volume V1 are incorrect values. Furthermore, by continuing the main filling while using the filling speed that is determined based on these incorrect values, the risk of the hydrogen tank 12 overheating is increased. Therefore, when the error between the estimated volume V3 and the first provisional volume V1 is outside the tolerable range, the filling control section 60 reduces the filling speed. By reducing the filling speed, the risk of the hydrogen tank 12 overheating can be suppressed.

According to the present embodiment, if the pressure judging section 62 judges that the gas pressure Pi does not exceed the first threshold value TH1, the volume estimating section 68 does not estimate the estimated volume V3. The reason for this is as follows.

When the gas pressure inside the hydrogen tank 12 is relatively low, the temperature of the hydrogen tank 12 is also relatively low. When the temperature of the hydrogen tank 12 is relatively low, the risk of the hydrogen tank 12 overheating during the hydrogen filling is low. Accordingly, when the gas pressure inside the hydrogen tank 12 is relatively low, the risk of the hydrogen tank 12 overheating during the hydrogen filling is low. When the risk of the hydrogen tank 12 overheating is low, it is preferable from the perspective of the user of the hydrogen filling device 20 that the hydrogen filling end as quickly as possible without changing the filling speed. In light of this, when the gas pressure inside the hydrogen tank 12 is less than or equal to the first threshold value TH1, the filling control section 60 need not switch the filling speed based on the estimated volume V3. For such a reason, when the gas pressure is less than or equal to the first threshold value TH1, the volume estimating section 68 need not estimate the estimated volume V3.

Figure 3:
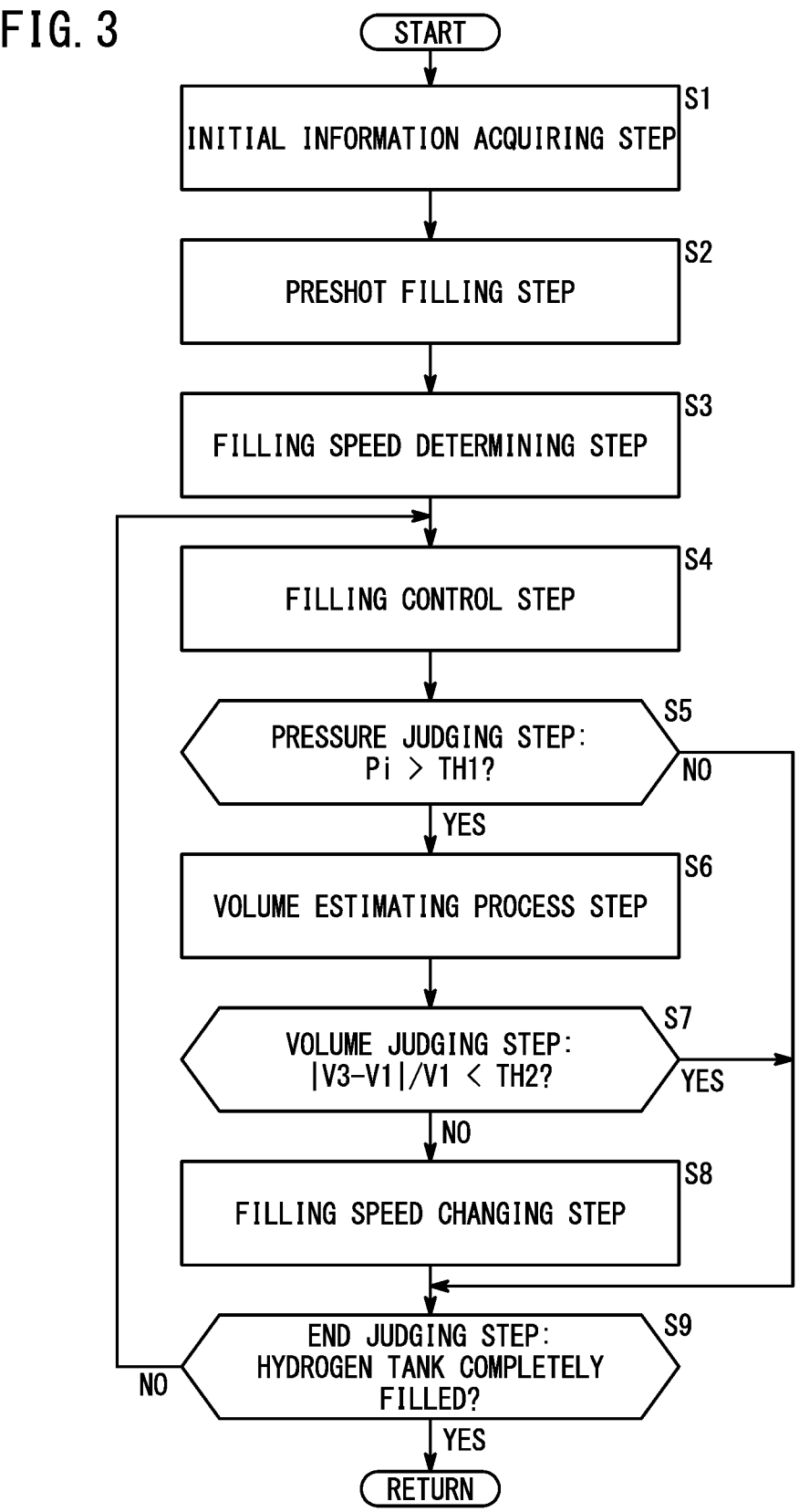
FIG. 3 is a flow chart showing a hydrogen filling method according to an embodiment.

FIG. 3 is a flow chart showing the hydrogen filling method according to the present embodiment.

The control device 38 can perform the hydrogen filling method of FIG. 3, for example. The hydrogen filling method of FIG. 3 includes an initial information acquiring step S1, a preshot filling step S2, a filling speed determining step S3, and a filling control step S4. Furthermore, the hydrogen filling method of FIG. 3 further includes a pressure judging step S5, a volume estimating process step S6, a volume judging step S7, a filling speed changing step S8, and an end judging step S9.

In the initial information acquiring step Si, the vehicle information acquiring section 52 acquires the vehicle information SIG (TIR, VIR, and PIR) via the receiver 36. The control device 38 can acquire the first provisional volume V1 based on the volume information VIR acquired in the initial information acquiring step S1.

In the preshot filling step S2, the filling control section 60 controls the adjustment valve 26 to perform the preshot filling. Due to this, the gas pressure inside the hydrogen tank 12 and the gas pressure inside the supplying portion 22 become the same. Due to the gas pressure inside the hydrogen tank 12 and the gas pressure inside the supplying portion 22 being the same, the control device 38 becomes able to acquire the gas pressure inside the hydrogen tank 12 based on the detection signal of the pressure sensor 28. For example, the control device 38 can acquire the initial pressure PI of the hydrogen tank 12 based on the detection signal output by the pressure sensor 28 after the preshot filling. Furthermore, due to the completion of the preshot filling step S2, the control device 38 can acquire the hydrogen filling amount based on the detection signal of the flow rate sensor 72.

In the filling speed determining step S3, the filling control section 60 determines the filling speed for the main filling. Here, if the difference between the first provisional volume V1 and the second provisional volume V2 is greater than or equal to the prescribed value, the filling control section 60 selects the lowest filling speed among the filling control maps 50, for example. The provisional volume acquiring section 58 acquires the second provisional volume V2 in advance, so that the filling control section 60 can make the comparison between the first provisional volume V1 and the second provisional volume V2. If the difference between the first provisional volume V1 and the second provisional volume V2 is less than the prescribed value, the filling control section 60 uses the initial pressure PI, the second provisional volume V2, the thermal mass ratio TMR, and the filling control map 50 to determine the filling speed for the main filling. The thermal mass ratio acquiring section 54 acquires the thermal mass ratio TMR in advance, so that the filling control section 60 can determine the filling speed for the main filling.

In the filling control step S4, the filling control section 60 controls the adjustment valve 26 to perform the main filling. Here, the filling control section 60 performs the main filling based on the filling speed determined in the filling speed determining step S3.

In the pressure judging step S5, the pressure judging section 62 judges whether the gas pressure Pi inside the hydrogen tank 12 after the start of the main filling exceeds the first threshold value TH1. If the pressure judging section 62 judges that the gas pressure Pi inside the hydrogen tank 12 exceeds the first threshold value TH1 (S5: YES), the control device (volume estimating device) 38 starts the volume estimating process step S6 (volume estimating method).

FIG. 4 is a flow chart showing an example of the volume estimating process step S6 of FIG. 3.

The volume estimating process step (volume estimating method) S6 includes a first gas density acquiring step S61 and a first corrected expansion rate acquiring step S62. The volume estimating process step S6 further includes a second gas density acquiring step S63, a second corrected expansion rate acquiring step S64, a filling amount acquiring step S65, and a volume estimating step S66.

In the first gas density acquiring step S61, the gas density acquiring section 64 acquires the first gas density $\rho_1$. The gas density acquiring section 64 acquires the first gas density $\rho_1$ based on the gas state equation, the gas pressure inside the hydrogen tank 12 at the first timing, and the tank temperature.

In the first corrected expansion rate acquiring step S62, the expansion rate acquiring section 66 acquires the first corrected expansion rate $\theta_1$. The expansion rate acquiring section 66 acquires the first corrected expansion rate $\theta_1$ using Expression (2).

In the second gas density acquiring step S63, the gas density acquiring section 64 acquires the second gas density $\rho_2$. The gas density acquiring section 64 acquires the second gas density $\rho_2$ based on the gas state equation, the gas pressure inside the hydrogen tank 12 at the second timing, and the tank temperature.

In the second corrected expansion rate acquiring step S64, the expansion rate acquiring section 66 acquires the second corrected expansion rate $\theta_2$. The expansion rate acquiring section 66 acquires the second corrected expansion rate $\theta_2$ using Expression (2).

In the filling amount acquiring step S65, the filling amount acquiring section 56 acquires the hydrogen filling amount in the period from the first timing to the second timing. That is, in the filling amount acquiring step S65, the filling amount acquiring section 56 acquires the total filling amount dm. The filling amount acquiring section 56 acquires the total filling amount dm based on the detection signal of the flow rate sensor 72.

In the volume estimating step S66, the volume estimating section 68 estimates the estimated volume V3. The volume estimating section 68 estimates the estimated volume V3 using Expression (3).

When the volume estimating step S66 is completed, the volume judging section 70 starts the volume judging step S7 of FIG. 3. In the volume judging step S7, the volume judging section 70 judges whether the difference (error) between the estimated volume V3 and the first provisional volume V1 is within the tolerable range, using the second threshold value TH2. For example, the volume judging section 70 judges whether |V3−V1|/V1<TH2 is satisfied, as shown in FIG. 3.

If the volume judging section 70 judges that the error between the estimated volume V3 and the first provisional volume V1 is outside the tolerable range (S7: NO), the filling control section 60 starts the filling speed changing step S8. In the filling speed changing step S8, the filling control section 60 switches the filling speed for the main filling to a filling speed that is lower than the filling speed determined in the filling speed determining step S3. If the lowest filling speed among the filling control maps 50 is selected in the filling speed determining step S3, the filling control section 60 may skip the filling speed changing step S8.

If the volume judging section 70 judges that the error between the estimated volume V3 and the first provisional volume V1 is less than the second threshold value TH2 (S7: YES), the filling control section 60 starts the end judging step S9. In the end judging step S9, the filling control section 60 judges whether the hydrogen tank 12 is completely filled. The filling control section 60 judges whether the hydrogen tank 12 is completely filled based on the gas density (gas pressure and tank pressure) of the hydrogen gas inside the hydrogen tank 12.

Also, if the pressure judging section 62 has judged in the pressure judging step S5 that the gas pressure Pi is less than or equal to the first threshold value TH1 (S5: NO), the filling control section 60 starts the end judging step S9.

If the hydrogen tank 12 is completely filled (S9: YES), the hydrogen filling method of FIG. 3 ends. If the hydrogen tank 12 is not completely filled (S9: NO), the filling control step S4 is performed again.

According to FIG. 3, in the case where the hydrogen tank 12 is not completely filled (S9: NO), it is possible for the volume estimating process step S6 and the volume judging step S7 to be performed again as well. Here, the first timing and the second timing described above may each be changed every time the volume estimating process step S6 is performed. For example, the first timing used in the volume estimating process step S6 performed for the second time may be a certain timing later than the first timing used in the volume estimating process step S6 performed for the first time. Similarly, the second timing used in the volume estimating process step S6 performed for the second time may be a certain timing later than the second timing used in the volume estimating process step S6 performed for the first time. Furthermore, only the second timing may be changed without changing the first timing between the volume estimating process step S6 performed for the first time and the volume estimating process step S6 performed for the second time.

Inventions Understandable from the Above Disclosure

The inventions that can be understood from the above disclosure will be described below.

<First Invention>

A first invention is the volume estimating device (38) that, when the hydrogen tank (12) of the vehicle (10) is to be filled with hydrogen gas from the supplying portion (22) of the hydrogen filling device (20), estimates a volume of the hydrogen tank, the volume estimating device including: the gas density acquiring section (64) that acquires the first gas density ($\rho_1$) inside the hydrogen tank based on gas pressure inside the hydrogen tank and a tank temperature at the first timing, and acquires the second gas density ($\rho_2$) inside the hydrogen tank based on the gas pressure and the tank temperature at the second timing that is after the first timing; the expansion rate acquiring section (66) that acquires the first corrected expansion rate ($\theta_1$) obtained by correcting the expansion rate of the hydrogen tank in a prescribed state based on the gas pressure at the first timing, and acquires the second corrected expansion rate ($\theta_2$) obtained by correcting the expansion rate based on the gas pressure at the second timing; the filling amount acquiring section (56) that acquires the total filling amount (dm) of the hydrogen gas that has filled the hydrogen tank from the hydrogen filling device in a period from the first timing to the second timing; and the volume estimating section (68) that estimates the volume (V3) of the hydrogen tank based on the volume ($V_{tube}$) of the supplying portion, the first gas density, the second gas density, the first corrected expansion rate, the second corrected expansion rate, and the total filling amount. According to this feature, it is possible to accurately estimate the volume of the hydrogen tank.

In the volume estimating device described above, the supplying portion may be provided with the flow rate sensor (72) for detecting a flow rate of the hydrogen gas sent to the hydrogen tank, and the volume ($V_{tube}$) of the supplying portion may be a volume of a region of the supplying portion between the flow rate sensor and the hydrogen tank. According to this feature, it is possible to more accurately estimate the volume of the hydrogen tank while taking into consideration the hydrogen gas amount remaining inside the supplying portion and an installation location of the flow rate sensor that outputs a detection signal corresponding to this hydrogen gas amount.

The volume estimating device described above may further include the pressure judging section (62) that judges whether the gas pressure exceeds a threshold value (TH1), and the volume estimating section may estimate the volume of the hydrogen tank in a case where the pressure judging section has judged that the gas pressure exceeds the threshold value, and the volume estimating section need not estimate the volume of the hydrogen tank in a case where the pressure judging section has judged that the gas pressure is less than or equal to the threshold value. According to this feature, the hydrogen filling device can quickly finish the hydrogen filling, which is preferable from the perspective of the user.

<Second Invention>

A second invention is the hydrogen filling device (20) that fills the hydrogen tank (12) of the vehicle (10) with hydrogen gas based on the filling control map (50) indicating the filling speed of the hydrogen gas corresponding to the initial pressure (PI) inside the hydrogen tank, the hydrogen filling device including: the volume estimating device (38) described above; the provisional volume acquiring section (58) that acquires the provisional volume (V2) of the hydrogen tank based on the initial pressure; the volume judging section (70) that judges whether a difference between the provisional volume and the volume of the hydrogen tank estimated by the volume estimating device is within the tolerable range; and the filling control section (60) that, in a case where the volume judging section has judged that the difference is outside the tolerable range, fills the hydrogen tank with the hydrogen gas at a filling speed that is lower than the filling speed corresponding to the initial pressure. According to this feature, it is possible to accurately estimate the volume of the hydrogen tank.

<Third Invention>

A third invention is the volume estimating method for, when the hydrogen tank (12) of the vehicle (10) is to be filled with hydrogen gas from the supplying portion (22) of the hydrogen filling device (20), estimating a volume of the hydrogen tank, the volume estimating method including: the first gas density acquiring step (S61) of acquiring the first gas density ($\rho_1$) inside the hydrogen tank based on gas pressure inside the hydrogen tank and a tank temperature at the first timing; the first corrected expansion rate acquiring step (S62) of acquiring the first corrected expansion rate ($\theta_1$) obtained by correcting the expansion rate of the hydrogen tank in a prescribed state based on the gas pressure at the first timing; the second gas density acquiring step (S63) of acquiring the second gas density ($\rho_2$) inside the hydrogen tank based on the gas pressure and the tank temperature at the second timing that is after the first timing; the second corrected expansion rate acquiring step (S64) of acquiring the second corrected expansion rate ($\theta_2$) obtained by correcting the expansion rate based on the gas pressure at the second timing; the filling amount acquiring step (S65) of acquiring the total filling amount (dm) of the hydrogen gas that has filled the hydrogen tank from the hydrogen filling device in a period from the first timing to the second timing; and the volume estimating step (S66) of estimating the volume (V3) of the hydrogen tank based on the volume ($V_{tube}$) of the supplying portion, the first gas density, the second gas density, the first corrected expansion rate, the second corrected expansion rate, and the total filling amount. According to this feature, it is possible to accurately estimate the volume of the hydrogen tank.

The present invention is not limited to the above disclosure, and various modifications are possible without departing from the essence and gist of the present invention.

The invention claimed is:

1. A volume estimating device that, when a hydrogen tank of a vehicle is to be filled with hydrogen gas from a supplying portion of a hydrogen filling device, estimates a volume of the hydrogen tank, the volume estimating device comprising one or more processors that execute computer-executable instructions stored in a memory, wherein the one or more processors execute the computer-executable instructions to cause the volume estimating device to:

acquire a first gas density inside the hydrogen tank based on gas pressure inside the hydrogen tank and a tank temperature at a first timing, and acquire a second gas density inside the hydrogen tank based on the gas pressure and the tank temperature at a second timing that is after the first timing;

acquire a first corrected expansion rate obtained by correcting an expansion rate of the hydrogen tank in a prescribed state based on the gas pressure at the first timing, and acquire a second corrected expansion rate obtained by correcting the expansion rate based on the gas pressure at the second timing;

acquire a total filling amount of the hydrogen gas that has filled the hydrogen tank from the hydrogen filling device in a period from the first timing to the second timing;

estimate a volume of the hydrogen tank based on a volume of the supplying portion, the first gas density, the second gas density, the first corrected expansion rate, the second corrected expansion rate, and the total filling amount;

judge whether the gas pressure exceeds a threshold value; and in a case where the gas pressure is judged to exceed the threshold value, estimate the volume of the hydrogen tank, and in a case where the gas pressure is judged to be less than or equal to the threshold value, not estimate the volume of the hydrogen tank.

2. The volume estimating device according to claim 1, wherein:

the supplying portion is provided with a flow rate sensor configured to detect a flow rate of the hydrogen gas sent to the hydrogen tank; and the volume of the supplying portion is a volume of a region of the supplying portion between the flow rate sensor and the hydrogen tank.

3. A hydrogen filling device that comprises the volume estimating device according to claim 1, and fills a hydrogen tank of a vehicle with hydrogen gas based on a filling control map indicating a filling speed of the hydrogen gas corresponding to an initial pressure inside the hydrogen tank, the hydrogen filling device comprising one or more processors that execute computer-executable instructions stored in a memory, wherein the one or more processors execute the computer-executable instructions to cause the hydrogen filling device to:

acquire a provisional volume of the hydrogen tank based on the initial pressure;

judge whether a difference between the provisional volume and the volume of the hydrogen tank estimated by the volume estimating device is within a tolerable range; and in a case where the difference is judged to be outside the tolerable range, fill the hydrogen tank with the hydrogen gas at a filling speed that is lower than the filling speed corresponding to the initial pressure.

4. A volume estimating method for, when a hydrogen tank of a vehicle is to be filled with hydrogen gas from a supplying portion of a hydrogen filling device, estimating a volume of the hydrogen tank, the volume estimating method comprising:

acquiring a first gas density inside the hydrogen tank based on gas pressure inside the hydrogen tank and a tank temperature at a first timing;

acquiring a first corrected expansion rate obtained by correcting an expansion rate of the hydrogen tank in a prescribed state based on the gas pressure at the first timing;

acquiring a second gas density inside the hydrogen tank based on the gas pressure and the tank temperature at a second timing that is after the first timing;

acquiring a second corrected expansion rate obtained by correcting the expansion rate based on the gas pressure at the second timing;

acquiring a total filling amount of the hydrogen gas that has filled the hydrogen tank from the hydrogen filling device in a period from the first timing to the second timing; and estimating a volume of the hydrogen tank based on a volume of the supplying portion, the first gas density, the second gas density, the first corrected expansion rate, the second corrected expansion rate, and the total filling amount;

judging whether the gas pressure exceeds a threshold value; and in a case where the gas pressure is judged to exceed the threshold value, estimating the volume of the hydrogen tank, and in a case where the gas pressure is judged to be less than or equal to the threshold value, not estimating the volume of the hydrogen tank.

* * * * *